(12) United States Patent
Anderson

(10) Patent No.: US 7,878,364 B1
(45) Date of Patent: Feb. 1, 2011

(54) CADDY FOR TOTING CLEANING TOOLS ON A TRASH PAIL

(76) Inventor: Percy L. Anderson, 1348 Webster Ave. #9B, Bronx, NY (US) 10456

( * ) Notice: Subject to any disclaimer, the term of this patent is extended or adjusted under 35 U.S.C. 154(b) by 699 days.

(21) Appl. No.: 11/900,767

(22) Filed: Sep. 13, 2007

(51) Int. Cl.
*B65D 1/40* (2006.01)
(52) U.S. Cl. .................. 220/735; 220/676; 220/23.4
(58) Field of Classification Search .......... 220/735, 220/736, 676, 23.4, 23.83, 23.86, 23.2, 505, 220/503
See application file for complete search history.

(56) References Cited

U.S. PATENT DOCUMENTS

| 2,399,056 A | * | 4/1946 | Oller ........................... 211/65 |
| 3,894,748 A | | 7/1975 | Ratcliff |
| 4,140,256 A | * | 2/1979 | King ........................... 294/143 |
| 4,350,366 A | | 9/1982 | Helms |
| 4,475,660 A | | 10/1984 | Cain |
| 5,395,023 A | * | 3/1995 | Naymark et al. ............ 224/682 |
| 6,260,865 B1 | | 7/2001 | Yacobi et al. |
| 7,168,714 B2 | | 1/2007 | Gibbs |
| 7,386,896 B2 | * | 6/2008 | Spicer ........................... 4/559 |

* cited by examiner

*Primary Examiner*—Stephen Castellano

(57) ABSTRACT

A caddy for toting cleaning tools on a trash pail which comprises a container having an open top to hold the cleaning tools therein. A mechanism is for attaching the container to a side of the trash pail, wherein a person can easily remove the cleaning tools from within the container, so as to fill the trash pail with refuse when the need arises.

7 Claims, 2 Drawing Sheets

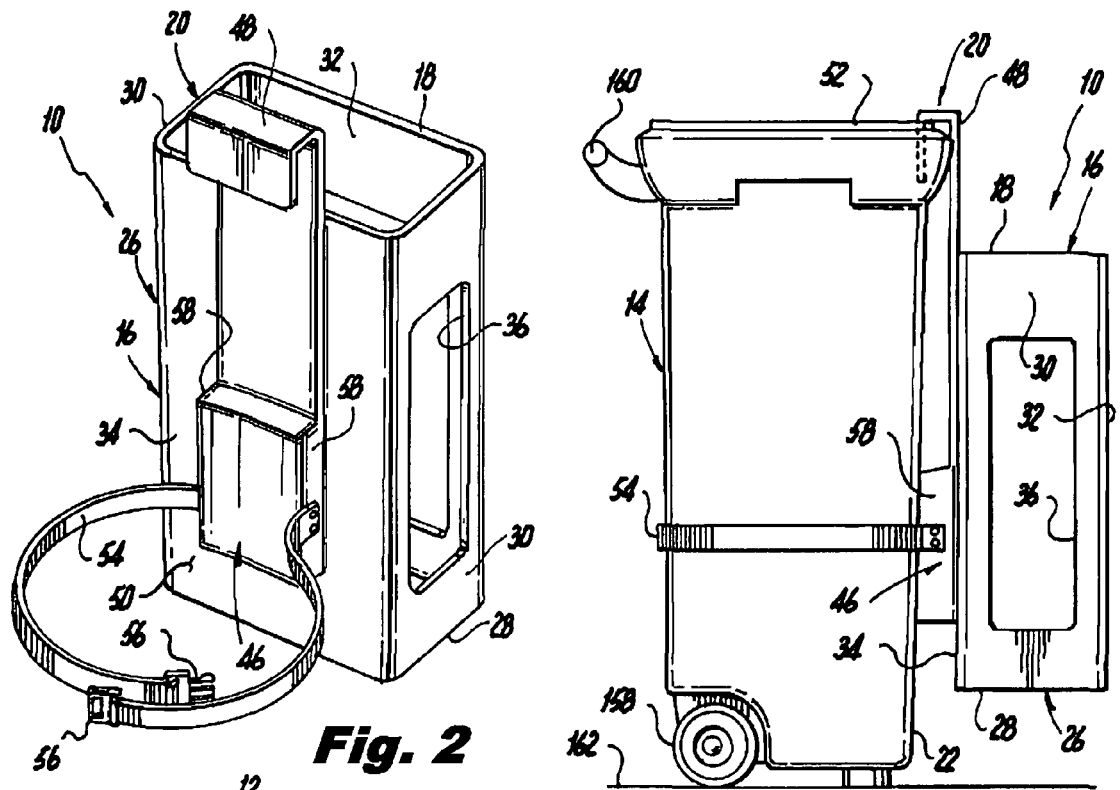
Fig. 2
Fig. 5
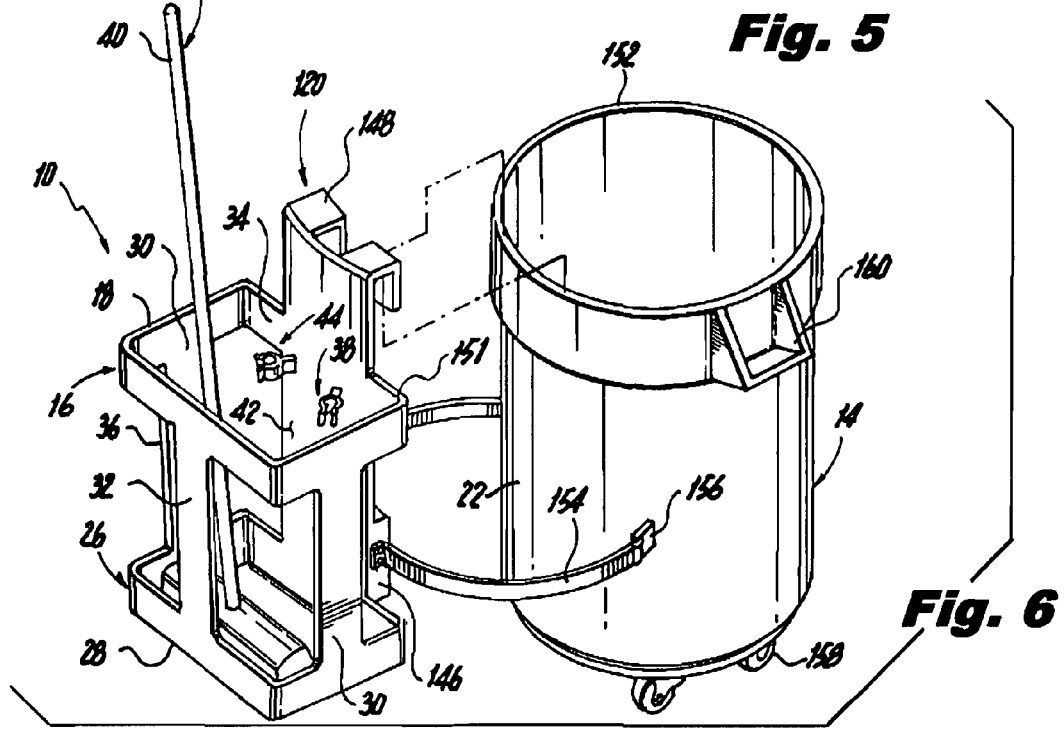
Fig. 6

CADDY FOR TOTING CLEANING TOOLS ON A TRASH PAIL

BACKGROUND OF THE INVENTION

1. Field of the Invention

The present invention relates to a caddy, and more particularly, a caddy for toting cleaning tools on a trash pail.

2. Description of the Prior Art

Numerous innovations for tool holders have been provided in the prior art that will be described. Even though these innovations may be suitable for the specific individual purposes to which they address, however, they differ from the present invention.

A FIRST EXAMPLE, U.S. Patent Office Document No. 3,894,748, Published/Issued on Jul. 15, 1975, to Ratcliff teaches a cart for transporting and storing garden implements having extended thin handles and head portions, such as hoes, rakes, shovels, and the like along with providing a carrier for containers of the type used for leaf and grass cuttings, all of such containers and implements being readily available on the cart with the cart provided with wheels for the easy rolling of the cart about the supporting surface from point to point for utilization, the cart being readily folded in a compact manner for storage and shipping purposes.

A SECOND EXAMPLE, U.S. Patent Office Document No. 4,350,366, Published/Issued on Sep. 21, 1982, to Helms teaches a manually propelled lawn and garden cart comprised of a bottom storage box and an open frame securely fastened to the top of the bottom storage box, means to support lawn and garden tools in the open frame and the bottom storage box, preferably by tubes fastened between holes in a cross piece at the top of the open frame, and a similar cross piece which is the top of the bottom storage box. Wings are pivotably attached between extensions to the bottom storage box and the open frame. The wings have brackets attached to them which receive a trash bag bracket pivotably attached to the open frame near its top so as to hold the lawn and garden cart in a stable position. An adjustable leg is attached to the bottom of each wing which may be adjusted so as to touch the ground when the lawn and garden cart is placed in a horizontal position so that the adjustable legs, together with wheels attached to the bottom storage box, form a 4 point support. A back box attached to the open frame has side brackets attached to it to receive pivots attached to a handle. The lawn and garden cart may be stored in a very small space in an upright position by closing the wings, adjusting the adjustable legs and placing the handle in an upright position.

A THIRD EXAMPLE, U.S. Patent Office Document No. 4,475,660, Published/Issued on Oct. 9, 1984, to Cain teaches a caddy for janitorial cleaning supplies in which a pair of compartmented supply-receiving units are supported in vertically spaced relation on a sheet-form standard capable of suspension by hooks from a circular or rectangular trash dolly as well as being capable of suspension from a manual carrying handle supported from the hooks. The caddy is additionally capable of standing erect on a floor to facilitate handling of multiple supplies in a janitorial service area.

A FOURTH EXAMPLE, U.S. Patent Office Document No. 6,260,865, Published/Issued on Jul. 17, 2001 to Yacobi et al. teaches a tool holder for at least one tool having a working end and a handle. The tool holder comprises a gripping device for the handle of the at least one tool, a base for supporting the working end of the at least one tool, and a substantially vertical structural support connected to the gripping device and the base for supporting the gripping device vertically upward from the base. The base includes an irregular surface for contacting an edge of the working end of the at least one tool, thereby restricting movement of the working end of the at least one tool along the base.

A FIFTH EXAMPLE, U.S. Patent Office Document No. 7,168,714, Published/Issued on Jan. 30, 2007, to Gibbs teaches a lawn and garden implement caddy that is useful for storing and transporting various implements, including long handled tools, hand tools and containers, useful in lawn and garden care. The caddy has a wheeled base with a front area having a container platform and a rear area that supports the head portion of the long handled tools. A central support interconnects the base with the top support and provides a plurality of shaped members that form a lower container enclosure and support the top support frame. The center support also includes a mechanism for supporting a lower container on or above the container platform. The top support frame forms a container enclosure in the front and a series of openings in the back configured to receive the handle end of the long handled tools. With the caddy, a lawn care worker can efficiently and effectively care for a lawn or garden.

It is apparent now that numerous innovations for tool holders have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a caddy for toting cleaning tools on a trash pail that avoids the disadvantages of the prior art.

ANOTHER OBJECT of the present invention is to provide a caddy for toting cleaning tools on a trash pail that is simple and inexpensive to manufacture.

STILL ANOTHER OBJECT of the present invention is to provide a caddy for toting cleaning tools on a trash pail that is simple to use.

BRIEFLY STATED, STILL YET ANOTHER OBJECT of the present invention is to provide a caddy for toting cleaning tools on a trash pail which comprises a container having an open top to hold the cleaning tools therein. A mechanism is for attaching the container to side of the trash pail, wherein a person can easily remove the cleaning tools from within the container, so as to fill the trash pail with refuse when the need arises.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a rear diagrammatic perspective view of the first embodiment per se;

FIG. 3 is an enlarged diagrammatic perspective view with parts broken away showing how the first embodiment hooks on to the top edge of the trash pail;

FIG. 4 is an enlarged diagrammatic perspective view of the area enclosed in the dotted circle indicated by arrow 4 in FIG. 1, showing the mechanism for holding a handle of one cleaning tool in place, in greater detail;

FIG. 5 is a diagrammatic side elevational view of the first embodiment installed on the box-shaped trash pail; and FIG. 6 is an exploded diagrammatic perspective view of a second embodiment of the present invention showing how it is to be installed on a circular-shaped trash pail.

A MARSHALING OF REFERENCE NUMERALS UTILIZED IN THE DRAWING

Figure 1:
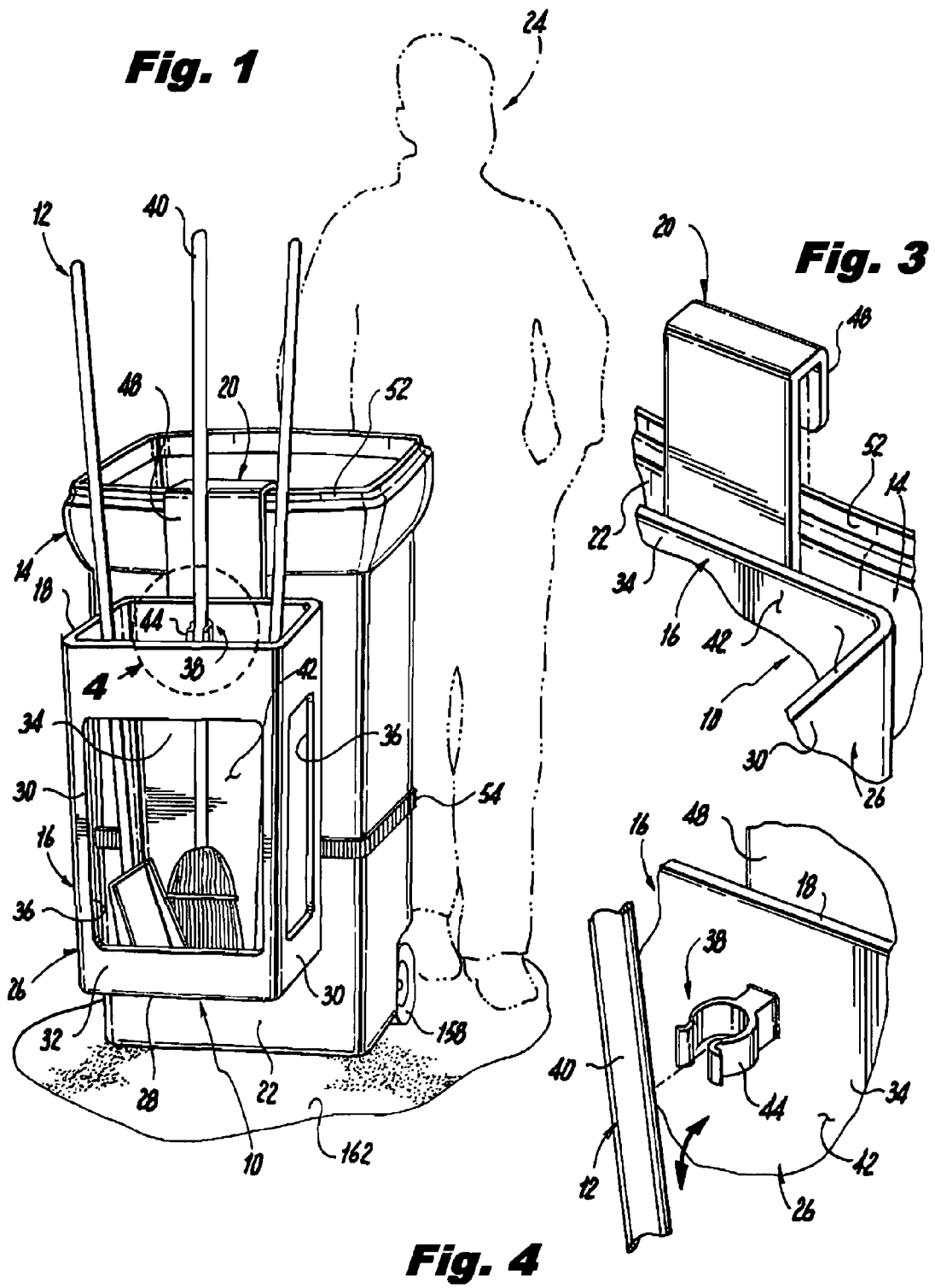
FIG. 1 is a diagrammatic perspective view of a first embodiment of the present invention installed for use on a box-shaped trash pail.

| | |
|---|---|
| 10 | caddy |
| 12 | cleaning tool |
| 14 | trash pail |
| 16 | container of caddy 10 |
| 18 | open top of container 16 |
| 20 | attaching mechanism of caddy 10 |
| 22 | side of trash pail 14 |
| 24 | person |
| 26 | box-shaped member for container 16 |
| 28 | bottom wall of box-shaped member 26 |
| 30 | side wall of box-shaped member 26 |
| 32 | front wall of box-shaped member 26 |
| 34 | rear wall of box-shaped member 26 |
| 36 | cut-out area in container 16 |
| 38 | releasably retaining mechanism of caddy 10 |
| 40 | elongated handle of cleaning tool 12 |
| 42 | interior surface of rear wall 34 |
| 44 | spring clip of releasably retaining mechanism 38 |
| 46 | housing of attaching mechanism 20 |
| 48 | hook member of housing 46 |
| 50 | exterior surface of rear wall 34 |
| 52 | generally straight top edge of trash pail 14 |
| 54 | belt of attaching mechanism 20 |
| 56 | two-part snap release buckle of belt 54 |
| 58 | side of housing 46 |
| 120 | modified attaching mechanism |
| 146 | housing of modified attaching mechanism 120 |
| 148 | curved double hook member |
| 151 | top edge of rear wall 34 |
| 152 | curved top edge of trash pail 14 |
| 154 | belt of modified attaching mechanism 120 |
| 156 | two-part snap release buckle of belt 154 |
| 158 | wheel on trash pail 14 |
| 160 | handgrip on trash pail 14 |
| 162 | floor surface |

DETAILED DESCRIPTION OF THE PREFERRED EMBODIMENT

Referring now to the figures, in which like numerals indicate like parts, and particularly to FIGS. 1 through 6, which are a diagrammatic perspective view of a first embodiment of the present invention installed for use on a box-shaped trash pail; a rear diagrammatic perspective view of the first embodiment per se; an enlarged diagrammatic perspective view with parts broken away showing how the first embodiment hooks on to the top edge of the trash pail; an enlarged diagrammatic perspective view of the area enclosed in the dotted circle indicated by arrow 4 in FIG. 1, showing the mechanism for holding a handle of one cleaning tool in place, in greater detail; a diagrammatic side elevational view of the first embodiment installed on the box-shaped trash pail; and an exploded diagrammatic perspective view of a second embodiment of the present invention showing how it is to be installed on a circular-shaped trash pail, and as such, will be discussed with reference thereto.

The present invention is a caddy 10 for toting cleaning tools 12 on a trash pail 14 which comprises a container 16 having an open top 18 to hold the cleaning tools 12 therein. A mechanism 20 is for attaching the container 16 to a side 22 of the trash pail 14, wherein a person 24 can easily remove the cleaning tools 12 from within the container 16, so as to fill the trash pail 14 with refuse when the need arises.

The container 16 comprises a box-shaped member 26 having a bottom wall 28, a pair of side walls 30, a front wall 32 and a rear wall 34. The container 16 has a plurality of cut-out areas 36 to make the container 16 lighter in weight and allow the person 24 to better look into the container 16 to see and identify the cleaning tools 12 therein.

The caddy 10 further comprises a mechanism 38 for releasably retaining elongated handles 40 of the cleaning tools 12 to an interior surface 42 of the rear wall 34 within the box-shaped member 26 of the container 16. The releasably retaining mechanism 38 comprises a plurality of spring clips 44. Each spring clip 44 is mounted to the interior surface 42 of the rear wall 34 of the box-shaped member 26 of the container 16. The elongated handle 40 of one cleaning tool 12 can snap into one spring clip 44 to be held in a stationary position within the container 16.

The attaching mechanism 20, as best seen in FIG. 2, comprises a housing 46 having a hook member 48 extending upwardly therefrom. The housing 46 is secured to an exterior surface 50 of the rear wall 34 of the box-shaped member 26 of the container 16, so that the hook member 48 can engage with a generally straight top edge 52 of the trash pail 14. The attaching mechanism 20 further comprises a belt 54 having a two-part snap release buckle 56. The belt 54 is connected to opposite sides 58 of the housing 46. The belt 54 can be wrapped about the trash pail 14 and the two-part snap release buckle 56 be engaged together.

FIG. 6 shows a modified attaching mechanism 120 which comprises a curved double hook member 148 extending upwardly from a top edge 151 of the rear wall 34 of the box-shaped member 26 of the container 16. The curved double hook member 148 can engage with a curved top edge 152 of the trash pail 14.

The modified mechanism 120 further comprises a housing 146 integral with the exterior surface 50 of the rear wall 34 of the box-shaped member 26 of the container 16. A belt 154 has a two-part snap release buckle 156. The belt 154 is connected to opposite sides 158 of the housing 146. The belt 154 can be wrapped about the trash pail 14 and the two-part snap release buckle 156 be engaged together.

The trash pail 13, as shown in FIGS. 1, 5 and 6, may contain wheels 158 and a handgrip 160, so that the trash pail 14 can be pulled along a floor surface 162 by the person 24. The cleaning tools 12 could consist of brooms, scrap pans, shovels, rakes or any other types having the elongated handle 40 thereon. The caddy 10 may be fabricated out of a heavy-duty, lightweight plastic material. The caddy 10 is typically two and a half to three feet tall, one foot long and a half foot deep which can hold three cleaning tools 12 thereon.

It will be understood that each of the elements described above, or two or more together, may also find a useful application in other types of constructions differing from the types described above.

While the invention has been illustrated and described as embodiments of a caddy for toting cleaning tools on a trash pail, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A caddy for toting cleaning tools on a trash pail which comprises:
   a) a container having an open top to hold the cleaning tools therein; and
   b) means for attaching said container to one side of the trash pail, wherein a person can easily remove the cleaning tools from within said container, so as to fill the trash pail with refuse when the need arises;
   wherein said container comprises a box-shaped member having a bottom wall and four sidewalls, wherein one of the sidewalls is a rear wall;
   wherein said container having a plurality of cut-out areas to make said container lighter in weight and allow the person to better look into said container to see and identify the cleaning tools therein;
   further comprising corners connecting the side edges of the sidewalls, each cut-out area is the only cut-out area positioned at a respective corner such that the cut-out area opens the two adjacent sidewalls of the respective corner, each cut-out area is bordered on top, bottom and lateral sides by sidewall portions.

2. The caddy as recited in claim 1 further comprises a means for releasably retaining elongated handles of the cleaning tools to an interior surface of said rear wall within said box-shaped member of said container.

3. The caddy as recited in claim 2, wherein said releasably retaining means comprises a plurality of spring clips, in which each said spring clip is mounted to said interior surface of said rear wall of said box-shaped member of said container, so that the elongated handle of one cleaning tool can snap into one said spring clip to be held in a stationary position within said container.

4. The caddy as recited in claim 3, wherein said attaching means comprises a housing having a hook member extending upwardly therefrom, said housing secured to an exterior surface of said rear wall of said box-shaped member of said container, so that said hook member can engage with a generally straight top edge of the trash pail.

5. The caddy as recited in claim 4, wherein said attaching means further comprises a belt having a two-part snap release buckle, wherein said belt is connected to opposite sides of said housing, so that said belt can be wrapped about the trash pail and said two-part snap release buckle be engaged together.

6. The caddy as recited in claim 3, wherein said attaching means comprises a curved double hook member extending upwardly from a top edge of said rear wall of said box-shaped member of said container, said double hook member having two distinct hooks, each hook is curved, so that said curved double hook member can engage with a curved top edge of the trash pail.

7. The caddy as recited in claim 6, wherein said attaching means further comprises:
   a) a housing integral with an exterior surface of said rear wall of said box-shaped member of said container; and
   b) a belt having a two-part snap release buckle, wherein said belt is connected to opposite sides of said housing, so that said belt can be wrapped about the trash pail and said two-part snap release buckle be engaged together.

* * * * *